L. DAVIS, Jr.
Cultivator.

No. 214,113. Patented April 8, 1879.

Attest:
H. L. Perrine,
Floyd Norris

Inventor:
Levi Davis, Jr.
By Johnson & Johnson
Atty's

UNITED STATES PATENT OFFICE.

LEVI DAVIS, JR., OF BIG ROCK, ILLINOIS.

IMPROVEMENT IN CULTIVATORS.

Specification forming part of Letters Patent No. 214,113, dated April 8, 1879; application filed November 22, 1878.

*To all whom it may concern:*

Be it known that I, LEVI DAVIS, Jr., of Big Rock, in the county of Kane and State of Illinois, have invented certain new and useful Improvements in Cultivators; and I do hereby declare the following to be a full, clear, and exact description of the same, reference being had to the accompanying drawings, forming part of this specification, and in which—

Figure 1:
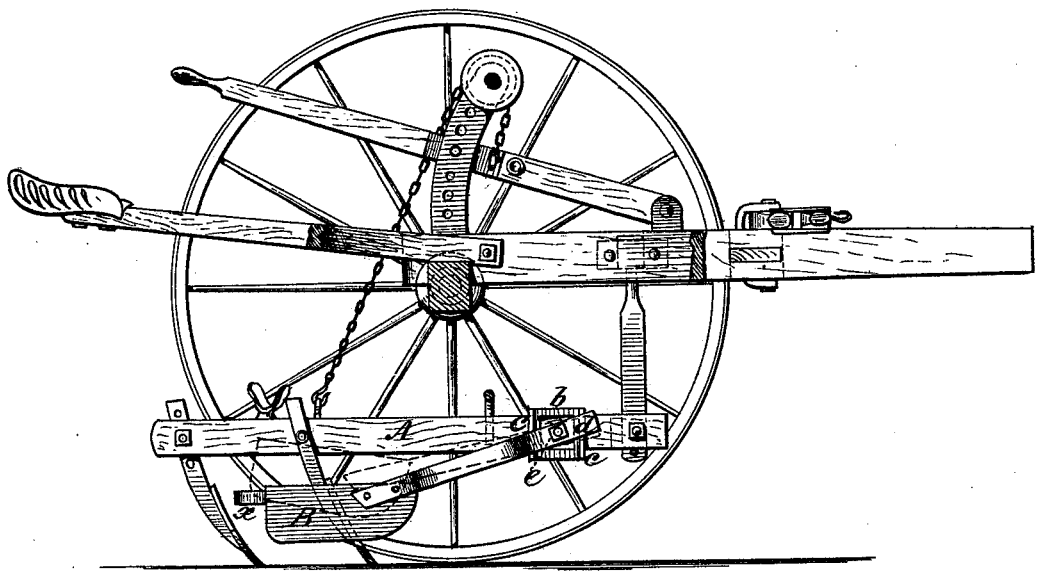
Figure 2:
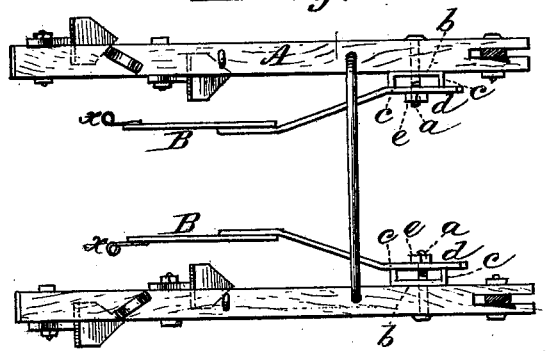

Figure 1 represents a vertical longitudinal section of a "straddle-row" cultivator, embracing my improvements in shields for such cultivators, and showing by dotted lines the adjustability of said shields to different heights; Fig. 2, a top view of the plow-beams and shields; and Figs. 3 and 4, details of the shovel-beams, showing my special improvements.

The invention relates, more particularly, to hill-side straddle-row cultivators; and it consists in means whereby the shields or guards, which run upon the surface of the ground, one upon each side of the hills of corn, and protect the young plants from injury, and prevent them from being covered up by the clods or earth which are displaced by the shovels, are rendered capable of adjustment to any desired height, each independently of the other, and held at such adjustment automatically, said adjustment being effected by the foot of the driver, without stopping the team, by his causing the shield-shank to act against the lipped friction-joint.

I am well aware that plow-shields have been made adjustable for the purpose of effecting the same results sought to be obtained by my cultivator; but so far as my experience goes with twenty different kinds of shields I find none which can be raised by the foot and remain at the desired height; nor do I find any that can be so raised and held without stopping the team to effect the adjustment.

A friction-joint is formed between the beam and the shank of the shield by means of a casting having angular bearing-lips, forming a seat for the shield-shank, a pivot-screw on the shovel-beam, and an outer nut, which drives the said shank against the said biting angular lips, and also against a central bearing, in such manner as to permit of the moving of the shank on the screw-pivot, while the force of the driver's foot is exerted to adjust the shield, but at the same time to hold the shield to its desired adjustment, and to resist the tendency of the shield to fall. Each shovel-beam has one of these shields and self-holding friction-joints.

Figure 3:
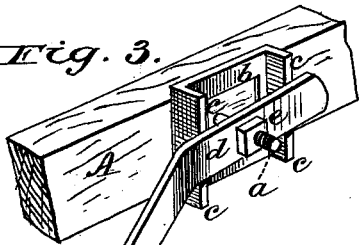

Referring to the drawings, and particularly to the detail, Fig. 3, A A are the shovel-beams, arranged and combined as is usual with this class of cultivators. On the inner side of each beam, just forward of the axle, there projects a pivot-screw, $a$, suitably fastened in said beam. This pivot passes through a casting, $b$, having angular lips or ridges $c\ c$, and a central bearing, $f$, upon which the shank $d$ of the shield B is clamped, as it is screwed against said bearing-lips by the nut $e$, which nut is only screwed when the shanks become loose, which is of rare occurrence.

The action of clamping by this device is such as to permit of the movement of the shank on its pivot only when force is applied, and to hold the shield to its desired adjustment by the biting action of the lipped casting, in connection with the nut and center plate, $f$, when the force is released.

The operation is as follows: The driver is plowing, for instance, a row of young corn on a hill-side, east and west. Going west, he raises one shield with the toe of his boot under the shield projection $x$ higher than the other, and so it remains at the point where he releases the force of his toe. While coming east he uses the other shield, and the operation is just the reverse. So, also, the shields are utilized for plowing through "basin-holes." No stoppage of the animals is necessary in adjusting the shields.

Figure 4:
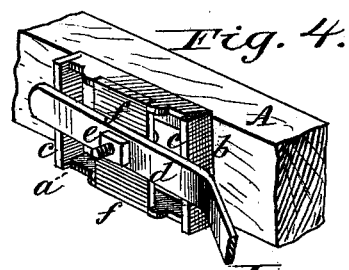

Although I have described my device irrespective of any particular cultivator, I have shown a particular one in the drawings; but, obviously, my device may be applied to any analogous cultivator. The central bearing-plate $f$, Fig. 4, gives a supporting-bearing for the shank $d$ between the lips, and at the point under the clamping action of the nuts.

I claim—

1. In a cultivator, the combination, with the shovel-beams and the shields, of an angular biting lipped casting, $b\ c\ c$, the pivot-screw

*a*, and the nut *e*, whereby the shank of the shield is clamped upon said lipped-plate casting by the nut in such manner as to be adjusted by the force of the driver's foot and preserved in its adjustment.

2. The shield-shank friction-joint formed by the casting *b c f*, pivot-screw, and clamp-nut.

3. The cultivator-shield B *d*, provided with the toe projection *x*, in combination with the friction or biting lipped casting, the pivot-screw, and the clamp-nut, as and for the purpose set forth.

LEVI DAVIS, Jr.

Witnesses:
JOEL WAGNER,
O. B. HALL.